(12) United States Patent  
Marsh

(10) Patent No.: US 7,480,793 B1
(45) Date of Patent: Jan. 20, 2009

(54) DYNAMICALLY CONFIGURING THE ENVIRONMENT OF A RECOVERY OS FROM AN INSTALLED OS

(75) Inventor: Russ Marsh, Lindon, UT (US)

(73) Assignee: Symantec Corporation, Cupertino, CA (US)

( * ) Notice: Subject to any disclaimer, the term of this patent is extended or adjusted under 35 U.S.C. 154(b) by 420 days.

(21) Appl. No.: 11/298,731

(22) Filed: Dec. 9, 2005

(51) Int. Cl.
*G06F 15/177* (2006.01)

(52) U.S. Cl. .................. 713/2; 713/1; 713/100

(58) Field of Classification Search ........... 713/1, 713/100, 2
See application file for complete search history.

(56) References Cited

U.S. PATENT DOCUMENTS

| | | | |
|---|---|---|---|
| 5,649,090 | A | 7/1997 | Edwards et al. |
| 6,330,690 | B1 | 12/2001 | Nouri et al. |
| 6,727,920 | B1 * | 4/2004 | Vineyard et al. ............ 715/810 |
| 7,340,638 | B2 | 3/2008 | Nicholson et al. |
| 2005/0125426 | A1 * | 6/2005 | Minematsu ................. 707/100 |
| 2007/0067843 | A1 * | 3/2007 | Williamson et al. ........... 726/24 |

* cited by examiner

*Primary Examiner*—Tse Chen
(74) *Attorney, Agent, or Firm*—Rory D. Rankin; Meyertons Hood Kivlin Kowert & Goetzel, P.C.

(57) ABSTRACT

A system and method for rebooting an operating system into a recovery environment. A computing system is configured to reboot an operating system into a recovery environment which mimics the environment of an installed operating system. Subsequent to initiating the reboot, the system performs a discovery operation to identify operating systems which are installed on the system. Upon identifying a type and/or version of an operating system which is installed, processes corresponding to an identified operating system are initiated to determine configuration information of the operating system. Subsequently, the determined configuration information is used to establish an environment for the recovery environment which mimics that of the installed operating system. Discovery procedures may include discovering physical disks coupled to the system, identifying logical volumes on each of the disks, and examining each of the logical volumes for installed operating systems. Ordinary boot of the system, and reboot of the system, may be accomplished via different devices. Reboot may be accomplished via portable media such as CD-ROM.

12 Claims, 4 Drawing Sheets

DYNAMICALLY CONFIGURING THE ENVIRONMENT OF A RECOVERY OS FROM AN INSTALLED OS

BACKGROUND OF THE INVENTION

1. Field of the Invention

This invention relates to computer systems and, more particularly, to recovery of computer systems.

2. Description of the Related Art

Many business organizations and governmental entities today increasingly rely upon mission-critical applications to provide services to both internal and external customers. Large data centers in such organizations may support complex mission-critical applications utilizing hundreds of processors and terabytes of data. Application down time, e.g., due to hardware or software failures, bugs, malicious intruders, or events such as power outages or natural disasters, may sometimes result in substantial revenue losses and/or loss of good will among customers in such environments. The importance of maintaining a high level of application availability has therefore been increasing over time.

Various approaches may be taken to increase the availability of the computing services provided at a data center, such as the use of redundant and/or fault-tolerant hardware and software, the deployment of security software and/or hardware such as anti-virus programs, firewalls and the like, extensive debugging of software prior to deployment in a production environment, etc. However, it may be hard or impossible to completely eliminate the occurrence of failures that may render a computer server unbootable. For example, storage devices including a system disk containing the operating system in use at the server may become corrupted or inoperable due to any of a variety of reasons, such as administrator error, mechanical failure or electrical failure. In order to be able to respond to such situations effectively, enterprises typically choose to implement recovery techniques of various kinds. Recovery techniques may be implemented for both local recovery and for remote recovery at one or more replication sites.

Computing systems and environments today may be fairly complex and may utilize equipment and software supplied by numerous disparate vendors. For example, one portion of a corporate computing system may be configured for use by engineers and other technical personnel for the purpose of product design and development, while another portion of the computing system may be configured for use by accounting and/or administrative personnel. Given the differing needs of such personnel, the equipment used by these groups my differ. Further, the operating systems and software used by these groups may differ as well. Even within a given group, various personnel may be using computers (e.g., desktop, notebook, workstation, handheld, etc.) which are configured differently. For example, one computer may have a UNIX® type operating system (OS) installed, while another may have a Windows® operating system installed. (UNIX is a trademark of Unix System Laboratories, Inc., and Windows is a trademark of Microsoft Corporation). Alternatively, different versions of a given operating system may be installed on different computers. Still further, more than one operating system could be installed on a single machine.

In addition to the differing configurations of various computers, various individuals within an organization may have different needs with respect resource access. Consequently, each user's computer may be configured to suit that individual's needs. For example, drive letter mappings, environment variables, and network settings may all be customized for a particular user. In some cases, particular settings may be common to many users, but others may not.

In view of the diverse nature of the above described computing systems, managing such systems can be quite challenging. One scenario which may present itself to an IT professional is the recovery of a systems which has "crashed" or otherwise become inoperable. In order to deal with such situations, a network administrator may generally attempt to reboot/restart a system in order to diagnose or repair the problem(s). One approach to booting a system which has failed is to use a "boot" disk. Generally speaking, a boot disk is a disk (e.g., CD ROM or floppy disk) which may be used to boot an operating system on a computer. Such boot disks may be created ahead of time for a specific machine and may include particulars concerning the environment of the machine for which it was created. In such a case, the boot disk is unique to that machine. Alternatively, a more generic boot disk could be created which may be used for more than one machine. The more generic boot disk generally includes basic elements of an operating system, and may include a default environment. However, the more generic boot disk does not typically provide for the particulars of a given user's environment.

A similar approach to the boot disk is a recovery/preinstall type operating system such as Microsoft Windows Preinstallation Environment (PE). Recovery/preinstall environments such as Microsoft Windows PE have a default environment with default settings. Such default settings may generally include default drive letter mappings, environment variables, network settings, and so on. For many cases, the default values chosen by the recovery environment may be adequate or at least workable depending upon the requirements of a particular situation. However, there are situations where the default environment may not be adequate. For example, default drive letter assignments may not be acceptable as they may prohibit the completion of one or more tasks.

As an example, the default environment provided by a recovery environment such as that described above may not be suitable when the recovery OS is used to execute delayed commands that could not be executed while running within the installed OS. Commonly this occurs when resources that an application wants to modify are not modifiable within the installed OS because they are in use and cannot be locked by the application. The application may then schedule execution of the tasks in a recovery environment and initiate a shutdown and reboot into that recovery environment. By yielding to another operating environment, the application has last control and cannot predict what environment settings will exist during the delayed execution. Consequently, improper operation may occur upon reboot.

In addition to the delayed execution model already mentioned, recovery environments like Windows PE are increasingly used for diagnostics and support by IT professionals. By booting into a recovery OS on a machine of interest, a system administrator can check file systems, OS settings, etc. Here again, they well inherit the default settings of the recovery environment. Because the recovery OS does not use the user's environment settings, diagnosis of a problem may be more difficult. For example, the user's drive letter assignments may differ from those of the recovery OS. Generally speaking, it would be preferable to receive the same drive letter assignments as the installed OS. This would make diagnosis more straight forward and eliminate guessing about which drive is which, and so on.

In view of the above, a method and mechanism for booting an operating system with an installed environment is desired.

SUMMARY

Methods and mechanisms for booting a recovery operating system with an installed environment are contemplated.

A computing system is contemplated which includes a host, system disk, and processor. During ordinary operation, the host is configured to boot an operating system from the coupled system disk. The host is further configured to reboot an operating system into a recovery environment which mimics the environment of the installed operating system. In one embodiment, the reboot operation is performed via a device other than the system disk. Subsequent to initiating the reboot, the system performs a discovery operation to identify operating systems which are installed on the host. Upon identifying a type and/or version of an operating system which is installed, the reboot procedure is configured to initiate a procedure to locate and obtain configuration information of the installed operating system. Subsequently, the obtained configuration information is used in establishing an environment for the recovery environment which mimics that of the installed operating system.

Also contemplated is a system which is configured to begin operations in a first environment, and schedule tasks for execution or completion in a different environment. Discovery procedures may include discovering physical disks coupled to the system, identifying logical volumes on each of the disks, and examining each of the logical volumes for installed operating systems. Ordinary boot of the system, and reboot of the system, may be accomplished via different devices. Reboot may be accomplished via portable media such as CD-ROM.

Also contemplated is a method and mechanism for rebooting a host with a portable device into a recovery environment for purposes of diagnosis and/or maintenance. In order to facilitate improved diagnostic capability, the reboot procedure performs discovery procedures on the host in order to identify an environment of a particular user. In the event discovery identifies more than one installed operating system, an administrator may be given the opportunity to select from a list of systems detected. Differing procedures may be utilized to identify the configuration and environment of the user depending upon the chosen operating system.

These and other embodiments are contemplated and will become apparent upon reference to the following description and drawings.

Figure 1:
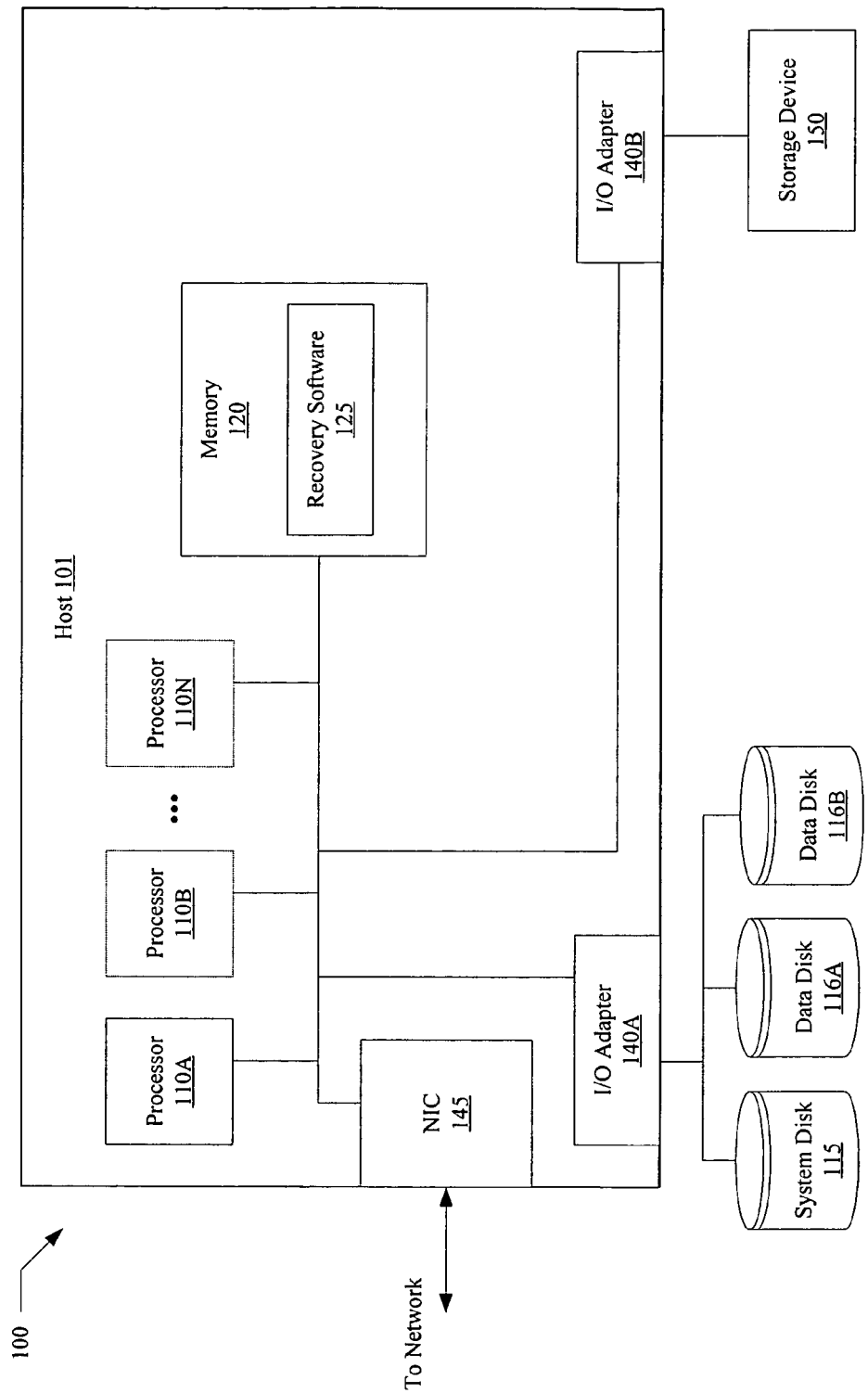
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating one embodiment of a computing system 100. As shown, system 100 includes a host 101 including one or more processors 110A, 110B, . . . 110N and a main memory 120. Host 101 may also include one or more network interface (NIC) cards such as NIC 145 allowing access to a network, as well as I/O adapters 140A and 140B. Elements referred to herein with a particular reference number followed by a letter may be collectively referred to by the reference number alone. For example, processors 110A-110N may be collectively referred to as processors 110. Each I/O adapter 140 may provide access to one or more storage devices, such as a system disk 115 and data disks 116 via I/O adapter 140A, and a storage device 150 (such as a CD-ROM) via I/O adapter 140B.

Following a failure of host 101, or in response to a system reboot by an administrator or process, recovery software 125 may be read in to main memory 125 (e.g., from storage device 150) during system boot. In one embodiment, the system is configured to reboot from the storage device 150 (e.g., a CD ROM). After host 101 has reached a designated operational state (e.g., a particular run level or boot level), a processor 110 executing the recovery software 125 may be configured to initiate a recovery of host 101 in accordance with a specified recovery method, for example a recovery method using data backed up from host 101 prior to the failure. Alternatively, an administrator may utilize various applications or tools in order to perform diagnosis or other maintenance oriented tasks. In one embodiment, host 101 may be brought to the designated operational state, for example by one or more modules of an operating system in cooperation with recovery software 125, without modifying contents of system disk 115. Further details on the specific operations performed by recovery software 125 in various embodiments are provided below.

Host 101 may be any type of computer system configured to support one or more applications. For example, in one embodiment, host 101 may support a database management system, or a portion of a distributed database management system, whose data may be stored within data disks 116. In another embodiment, host 101 may support an application server and/or one or more web servers that may form part of a multi-tier web-based application. In some embodiments, host 101 may be a client computer system supporting one or more productivity applications such as a word processor, a spreadsheet and/or an e-mail client. Periodic backups of host 101's data, e.g., data stored within system disk 115 and/or data disks 116, may be performed in some embodiments. The backed-up data may be stored in additional storage devices (not shown in FIG. 1) in some embodiments (for example, storage devices accessible via NIC 145), while in other embodiments at least a portion of the backed-up data may be stored within data disks 116. In some embodiments, the backed-up data may be stored at a remote disaster recovery site. If a failure occurs at host 101, the backed up data may be used to restore application state and/or the operating system at host 101.

Processors 110 may be implemented using any desired architecture or chip set, such as the SPARC™ architecture from Sun Microsystems or the x86-compatible architectures from Intel Corporation, Advanced Micro Devices, etc. Main memory 125 may be implemented using any appropriate medium such as any of various types of RAM (e.g., DRAM, SDRAM, RDRAM, SRAM, etc.). Any desired number of data disks 116 may be accessible directly or indirectly (e.g., using a Small Systems Computer Interface (SCSI) link, a fibre channel interconnect, a storage area network, etc.) from host 101 in various embodiments. In some embodiments, data disks 116 and/or system disk 115 may form part of one or more disk array devices, such as various forms of Redundant Array of Inexpensive Disk (RAID) devices or intelligent disk array devices. In addition to the components illustrated in FIG. 1, in some embodiments, host 101 may also include one or more peripheral devices such as a mouse and a keyboard, other input/output devices such as a display, as well as adapters for such devices.

Figure 2:
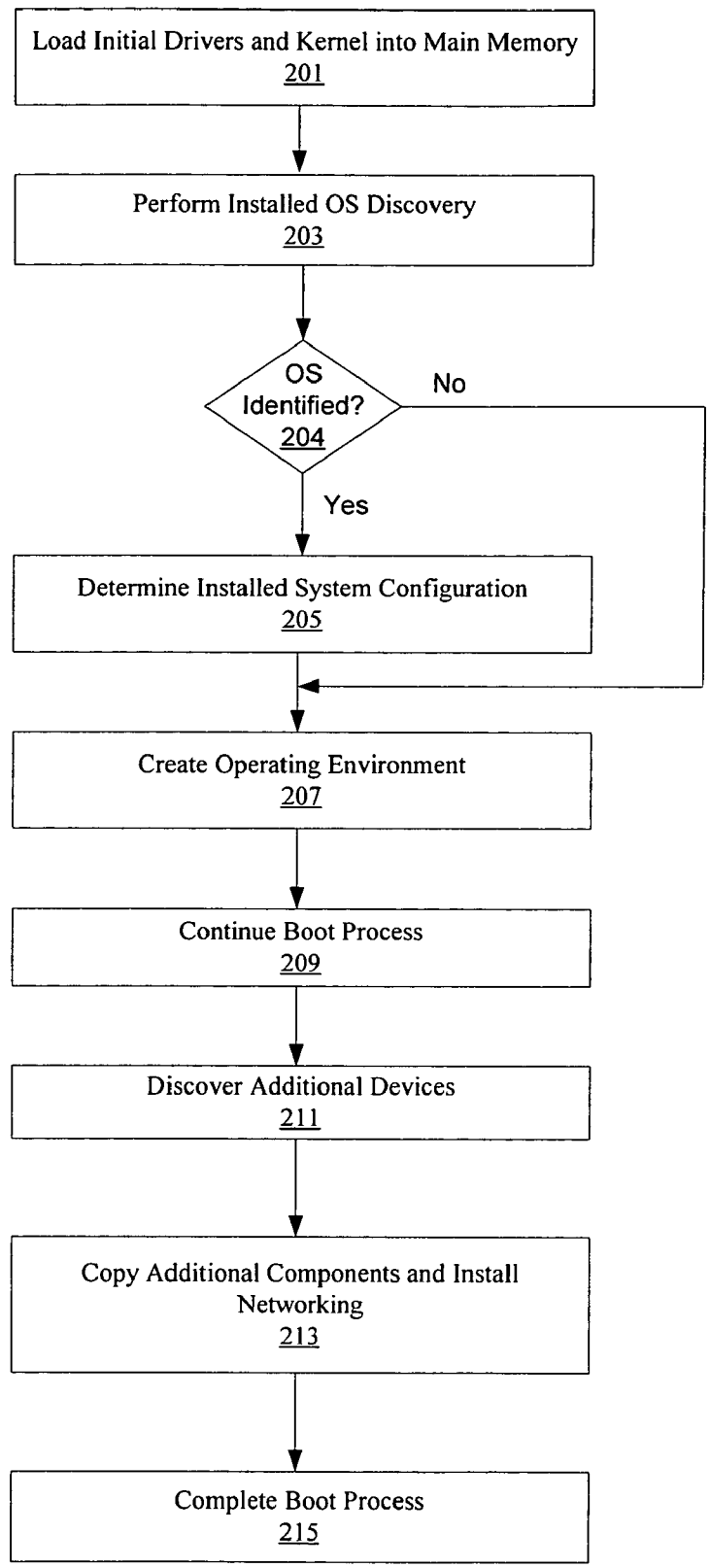
FIG. 2 is a flow diagram illustrating one embodiment of a recovery boot procedure.

Host 101 may be configured to use any appropriate operating system capable of supporting desired applications, such as a version of Windows™ from Microsoft Corporation, Linux, Solaris™ from Sun Microsystems, AIX™ from IBM Corporation, etc. In some embodiments, a custom operating system such as a real-time operating system may be used at host 101. In one embodiment, if a failure results in host 101 reaching an unbootable state (i.e., a state where a normal boot from system disk 115 does not succeed), the operating system may be configured to support a system setup procedure to help initiate a recovery of host 101. It is noted that the system setup procedure may be implemented using more than one operating system process or thread: that is, the system setup procedure may include a sequence of steps, where different steps may be performed by different software modules, or by different operating system processes or threads. The system setup procedure may, for example, allow host 101 to reach an operational state where one or more applications, such as a restoration method to restore data and/or state for a production application such as a database management system and/or various components of the operating system, may be executed. FIG. 2 is a flow diagram illustrating certain aspects of the operations that may be included in a system setup procedure supported by an operating system according to one embodiment.

In some environments (e.g., where the operating system vendor differs from the recovery software vendor), the software modules executed within the system setup procedure may be unaware of the specific requirements and functionality of the recovery and/or restoration method, and may therefore be configured to bring up the host 101 to a state where any of a number of general purpose applications may be executed before restoration is started. That is, for example, the system setup procedure natively supported by the operating system may not be optimized to cooperate with recovery software to achieve application restoration as rapidly as possible. As described below in further detail in conjunction with the descriptions of FIG. 3 and FIG. 4, in some embodiments, recovery software 125 may be configured to support an alternate technique (i.e., a technique different from that illustrated in FIG. 2) to bring up host 101 to a designated operational state.

In FIG. 2, one embodiment of a recovery boot procedure is depicted. In one embodiment, the procedure may be used to bring up host 101 into a desired operational state using a number of steps or phases, some of which may require manual interaction. For example, in a Windows® based operating system or another operating system that typically provides a graphical user interface to users, an early phase of the boot and setup procedure may include an execution of a text-mode setup script or program. The text-mode script may be used in the first phase, for example, because it may not be possible to display graphics required for the typical graphical user interface during the earliest phase of system setup. Each successive phase may bring host 101 to a state allowing a larger variety of functions to be supported, until the desired operational state is attained (e.g., until the host is again capable of supporting applications that were being supported prior to the failure). It is noted that while a system reboot subsequent to a system failure is often used in the discussion, the described system reboot need not follow a system failure. Rather, in some cases, an administrator may simply initiate a system boot for purposes of maintenance, or otherwise.

In one embodiment, reboot is performed from a device which is different from the device the host ordinarily boots from. For example, the host 101 may ordinarily boot from system disk 115, while reboot is performed from a different device such as a CD-ROM. As shown in block 201 of FIG. 2, a first step within the system setup procedure may include loading one or more device drivers and an operating system kernel into main memory 125, for example from a recovery disk (e.g., storage device 150). The device drivers may include drivers which allow access to the system disk 115 and supporting interactions required for subsequent operations (such as mouse or keyboard drivers). System disk 115 may generally represent a local or non-local disk from which host 101 ordinarily boots its operating system.

Generally speaking, an operating system may be configured to maintain a registry or database of configuration information, including both system configuration information (such as the names and locations of various components of the operating system and associated parameters such as security-related parameters) as well as application configuration information (such as a location of application executable program code, licensing information, startup parameters for applications, etc.) for use during normal operation. Such system configuration information may include information which is used to form the operating environment of the host.

In one embodiment, after the initial device drivers and the kernel have been loaded, a next step in the procedure may be a discovery process whereby an attempt is made to identify the installed OS (block 203). In one embodiment, the recovery OS 125 is preconfigured with information corresponding to one or more operating system versions and/or types (e.g., the Windows® NT operating system, or Windows® XP operating system). Based upon such information, the recovery OS 125 may perform discovery procedures corresponding to a given operating system. For example, in some operating systems, system configuration information may be in the form of one or more registry "hives" or aggregations of related configuration information. In other operating systems, the system configuration information may be stored in other formats.

During the discovery procedure, the recovery OS 125 may access and examine system disk 115 in an effort to identify what operating system(s) is currently installed. For example, the recovery OS 125 may search for specific directories and files which are typically installed for a given operating system. If the directories and/or files corresponding to a particular operating system, or operating system version, are not found (decision block 204), the recovery OS 125 may assume that particular operating system is not installed. In such a case, an appropriate message could be generated which allows an administrator to decide what further action to take. Alternatively, the boot process may continue with default values used for the created operating environment (block 207).

If an installed OS is identified (decision block 204), configuration information for the installed OS may be determined (block 205) and utilized to create the operating system environment (block 207). For example, if the identified operating system corresponds to a Windows® operating system, a local registry may be examined to identify particular details concerning the installed OS, applications, mounted devices, drive letter assignments, and so on. Often times, scripts are used during the boot process to configure various aspects of the operating environment. For example, drive letter assignments may be made via execution of a script. In order to establish an operating environment which corresponds to that of the installed OS and a particular user, configuration information which is discovered may be used in an executed script. In one embodiment, a script may be dynamically generated (or an existing script modified), during the recovery process to include particulars of the discovered configuration information. For example, the drive letter assignments of a given user or installed operating system may be duplicated in the recovery OS. The generated script could also be written to disk for subsequent use or examination if desired.

Following discovery of the installed OS(es), the next phase of the system boot procedure may include a discovery of additional devices of host 101 (block 211) such as NIC 145, followed by a loading of additional drivers (e.g., from an installation CD-ROM) and operating system files (for example, files used to configure and/or manage the newly discovered devices) and an initialization of networking functionality. In one embodiment, networking initialization may require interaction with a user, for example to obtain an Internet Protocol (IP) address and other networking configuration information. The drivers discovered and loaded may, for example, include drivers for devices such as scanners, cameras, joysticks, audio/video devices etc. Optionally, in some operating systems, the boot procedure may include registration of various system components, such as Component Object Model (COM) components in certain Windows-based systems (block 213). Finally, the boot process may be completed (block 215).

Having completed the boot process, the host 101 may be brought to a state which corresponds to a particular user's environment, including driver letter assignments. Having established an environment which corresponds to the user's, an administrator may then being the process of diagnosing a failure or performing other tasks. Alternatively, if a delayed execution scenario is involved, the commands whose execution has been delayed will execute in the proper environment. Delayed execution with a proper environment may be critical. For example, a user may wish to backup a particular drive (e.g., drive "G"). Within the user's environment, the drive "G" is assigned to a particular volume. However, backup of "G" may not be currently possible for a variety of reasons. For example, the backup process may require the ability to lock the corresponding volume. If one or more volume handles are open for the volume to be backed up, the backup process may not be able to lock the volume and may not be able to proceed. Therefore, the backup process may initiate a system reboot in order to close the handles or otherwise gain control over the volume. Further backup processes are then scheduled for execution in the rebooted environment. However, the yielding to another operating environment, the backup application has last control and cannot predict what environment settings will exist at the time of delayed execution. In the absence of proper driver letter assignments, a different volume may be assigned to driver "G" which causes the wrong volume to be backup up. Discovering and utilizing an installed environment may serve to prevent such problems.

In addition to the above, once booted with the recovery OS, applications, including a restoration method, may be initiated. In certain embodiments, for example where a backup of host 101's data includes both application data and operating system data, the restoration method may include overwriting, modifying and/or changing the locations of operating system files that were written to system disk 115 during earlier phases of the system setup procedure. In other embodiments, a restoration method may include reconfiguration of portions of the system disk 115, e.g., by changing partition sizes, volume or partition names, etc. In addition, in some embodiments, the restoration method may include changing one or more file system types as well. For example, a portion of the system disk of a Window® based host 101 may have been formatted as an NTFS file system prior to a failure. If, during the recovery boot procedure, the system disk is formatted as a FAT file system, the file system type may have to be modified during restoration, which may require an additional reboot. The restoration method may also include restoration of application data stored within data disks 116 and/or system disk 115.

It is noted that the order in which various specific operations may be performed during a system setup procedure may vary in different embodiments, and for different operating systems. For example, in one embodiment, operating system configuration information such as one or more registry hives may be generated after a system disk has been partitioned and/or formatted, rather than before. In some embodiments, additional operating system software modules may be activated during various phases of the process. For example, in certain Windows™ based systems, several different operating environments or subsystems, such as a "native" environment, a "Win32" environment, an "OS/2" environment, a "POSIX" (Portable Operating System Interface) environment etc. may be supported, and different environments may be made available during successive stages of the system setup procedure. Each operating environment may support applications written for the corresponding interfaces: e.g., applications written in accordance with POSIX standards may be executed using the POSIX environment. In general, a recovery boot process may be developed to conform to any desired operating environment in such embodiments, and may be executed after the specific operating environment for which it was developed becomes available. Various other steps, not shown in FIG. 2, may also be included within a system setup procedure in some embodiments, and some steps illustrated in FIG. 2 may be omitted in other embodiments.

As noted above, in some embodiments the system configuration information discovered earlier (i.e., block 205) may be written to the system disk. For example, in some Windows® based operating systems, discovered registry hives could be written to the system disk as a separate file by the kernel or another operating system component. In addition, various other operating system files, including executable files as well as data files, may be copied to the system disk 115 (e.g., from an install CD-ROM provided by the operating system vendor). Both the system configuration information and the operating system files may be written to a device (such as a partition of the system disk) logically designated as the "system root" device in some embodiments. That is, in such embodiments, a module of the operating system may be configured to identify the physical device designated as the system root device, and write the system configuration information and operating system files to the physical device. As the software modules copying the operating system files and writing the configuration information may be unaware of the requirements of the restoration method that may be used later, some of the operating system files that are written to system disk 115 at this stage may not be required for the restoration method to run; that is, with respect to the requirements of the restoration method, more operating system files than are minimally necessary may be copied to the system disk during the system setup procedure.

As indicated in the description of FIG. 2, the system setup procedure supported by the operating system in use at host 101 may involve multiple steps including writing various operating system files to system disk 115 that may not be necessary to support a recovery method that may enable host 101 to support desired applications. Finally, some modifications of system disk 115 performed during the system setup procedure may be logically and/or physically undone or redone during the recovery method. Thus, several steps performed during the system setup procedure provided by the operating system may result in more work being done than may be strictly necessary to implement the recovery.

Figure 3:
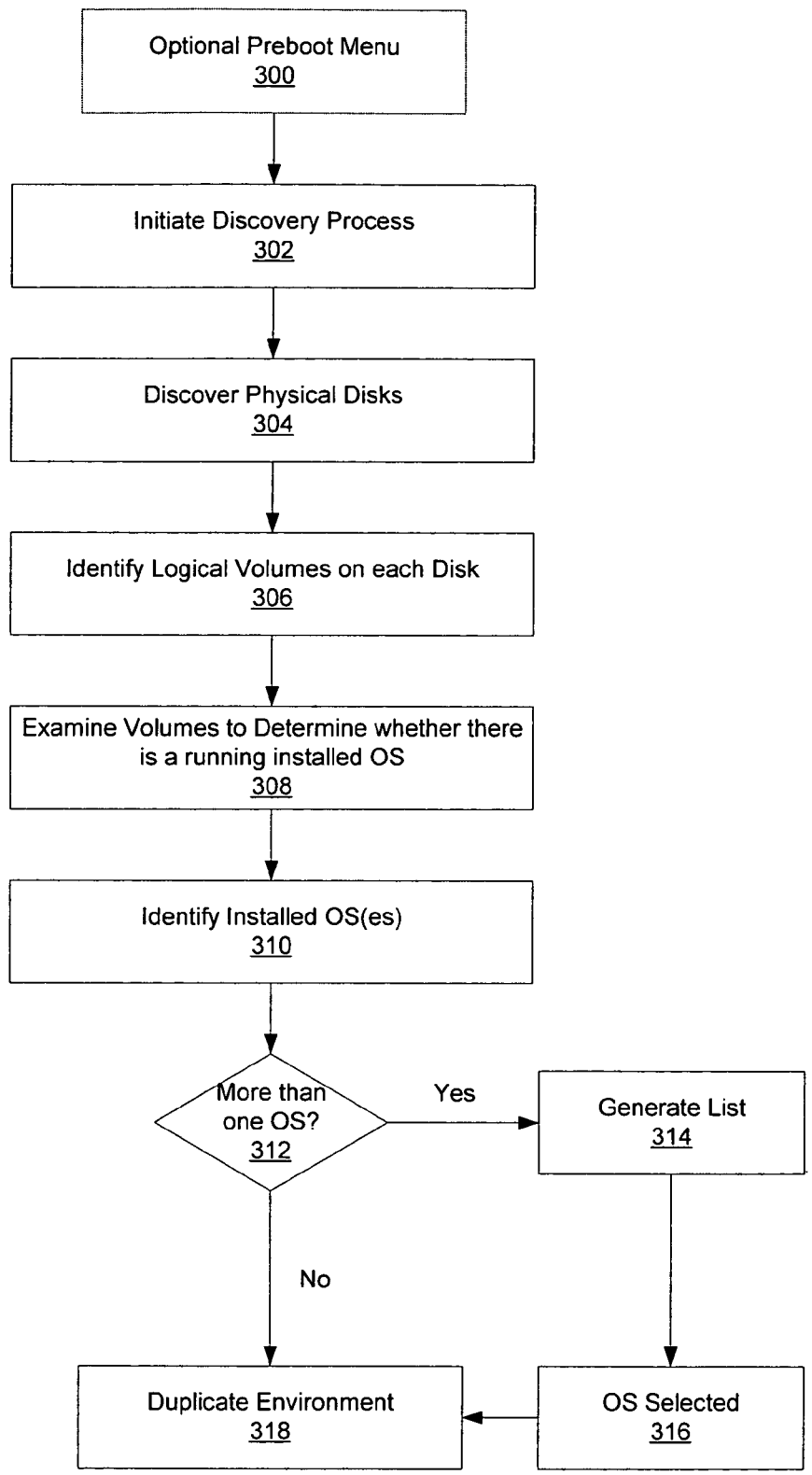
FIG. 3 is a flow diagram illustrating aspects of the recovery boot procedure.

FIG. 3 is a flow diagram illustrating aspects of one embodiment of a discovery procedure which generally corresponds to block 203 of FIG. 2. In one embodiment, there may be an optional preboot menu (block 300) which the recovery OS provides at some time before a discovery procedure is initiated or at any time early in the recovery process. In one embodiment, the recovery OS may have one or more "hot" keys that allow interactive control over an environment configuration program that executes during boot up. The user may then control the recovery boot program much the same as a hotkey sequence that launches a BIOS configuration utility. For example, an administrator may already know what operating system is installed on a particular machine. In such a case, the administrator may select the corresponding operating system from the menu which causes at least some portion of the discovery process (e.g., identifying the installed OS) to be bypassed. Alternatively, the administrator may wish to specify particular addresses or other location identifiers for desired resources. Numerous such alternatives are possible and are contemplated. If no selection is made during a predetermined timeout period, the process may continue unattended with a set of default values.

Subsequent to the optional preboot menu (block 300), the discovery process may be initiated (block 302). The discovery process may include discovering physical disks which are included in, or coupled to, the host (block 304), and identifying logical volumes on each of the discovered disks (block 306). Once one or more volumes have been identified, the discovery process may then examine the volumes to determine whether there are any running operating systems installed (block 308). Generally speaking, the process discovers installed operating systems by examining files systems on-disk and discerning type and version information for each operating system. If any operating systems are found, each may then be identified as to type, version, and so on (block 310). If it is determined that there is more than one OS installed (e.g., on a multi-boot system) decision block 312), a list of the installed operating systems may be generated (block 314) and presented for selection (block 316). In one embodiment, the process may simply default to one of the multiple identified operating systems if none are selected within a given period of time. After selection of a particular operating system, or if only one is installed, the installed operating system serves as a source for configuration details, and information concerning the installed environment is obtained in order to facilitate duplication of the installed environment (block 318) as described above.

Depending upon they operating system involved, various methods for gaining access to the configuration information of an installed operating system may be available. For example, in some Windows® operating systems, a RegRead method is provided which allows for the retrieval of registry entry values. In order to use the RegRead method, an instance of the WScript Shell object is first created. The RegRead method may then be called with a parameter specifying the registry entry you wand to read. For example, the version number of the Windows® operating system may be stored in HKLM\Software\Microsoft\Windows NT\CurrentVersion\CurrentVersion. Other operating systems may also provide methods for acquiring configuration information.

As discussed above, recovery software 125 may be configured to load an initial set of drivers and the operating system kernel into main memory 120 from storage device 150. In some embodiments, system configuration information (such as one or more registry hives in a Windows® based system) obtained via the discovery mechanism may be stored in memory 120 and used during boot (e.g., by the kernel using the loaded device drivers). In one embodiment, recovery software 125 may then be configured to redirect recovery boot processes to the location in memory where the registry information has been stored. In this manner, the boot process may proceed using the configuration information retrieved from the host.

Figure 4:
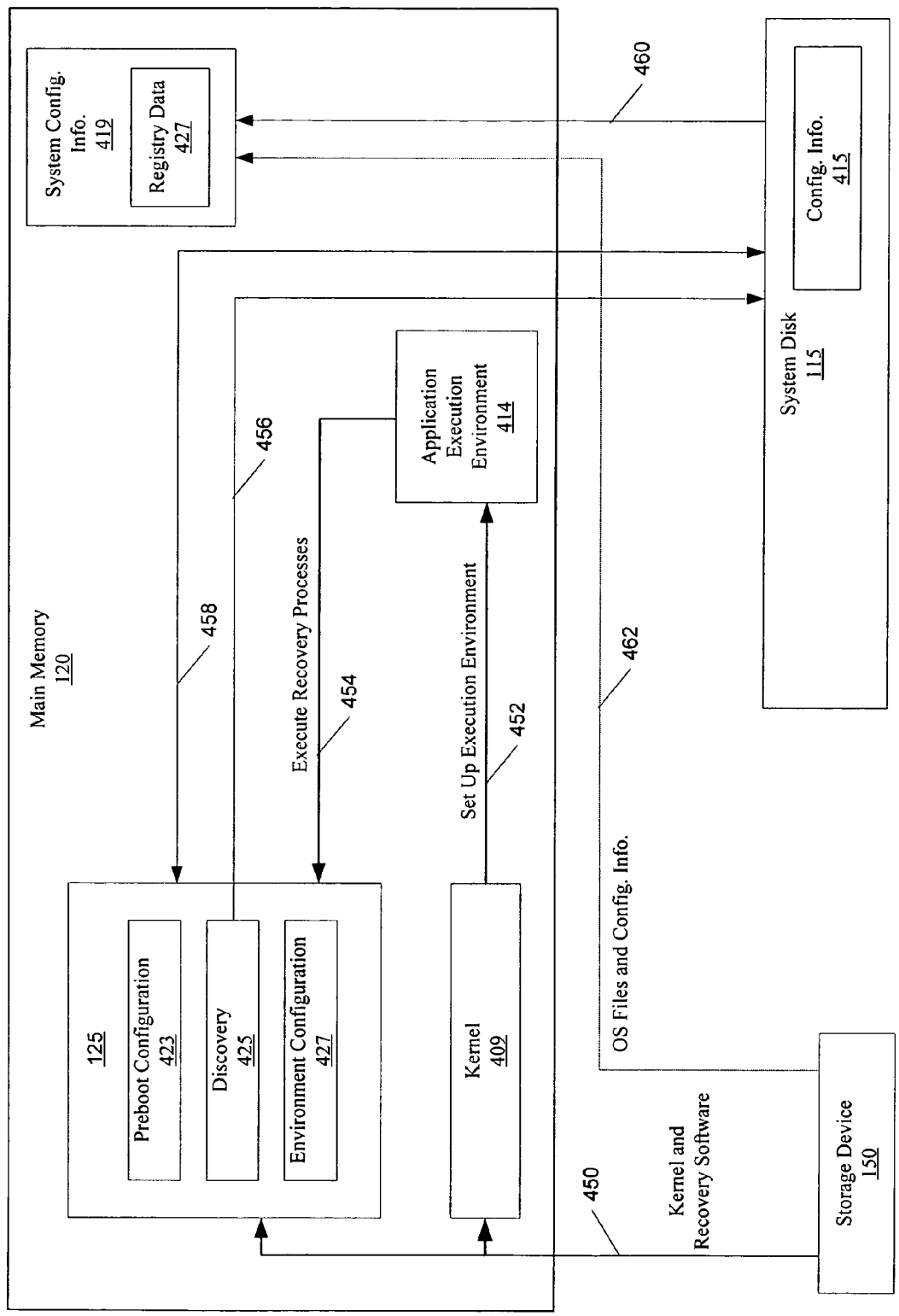
FIG. 4 is a block diagram illustrating one embodiment of aspects of the operation of recovery software and various operating system components.

FIG. 4 is a block diagram illustrating one embodiment of recovery boot processes of recovery software 125 and various operating system components described above. Depicted in FIG. 4 are a main memory 120, storage device 150, and system disk 155. In one embodiment, main memory 120 represents the memory of a host to be booted, storage device 150 may represent a CD ROM, and system disk 115 may represent the disk which includes the host's operating system components and configuration information 415.

Initially upon boot (or reboot) of the system in FIG. 4, portions of the recovery software 125, as well as an operating system kernel 409 and other operating system data (e.g., a file including a device driver for NIC 145), may first be loaded 450 into main memory 120 from storage device 150. Kernel 409 may then continue with processing typically performed during the boot procedure, including, for example, generating certain basic system configuration information 419 within main memory 120. The kernel 409 may also be configured to set up or activate 452 a first application execution environment 414, such as a session manager. After the first application execution environment 414 has been set up, processes of recovery software 125 may be executed 454. In the example shown, recovery software 125 includes processes to perform preboot configuration 423, discovery 425, and environment configuration 427. Discovery process 425 may then access 456 system disk 115 in an effort to determine what operating system(s), if any, is installed. If none is found, the process may continue with default values as described above. If one or more installed operating system are discovered, identification of the operating systems is returned 458 to the recovery software. Having identified an operating system, further discovery suitable for the given operating system may be performed 458. Configuration information 415 for the operating system may then be identified and returned. Some portion of the configuration information 415 may be written 460 to memory 460, and may include registry type data 427 such as that described above. Finally, when the host has reached an operational state with the desired environment, further backup processes and/or diagnostic procedures may be performed.

It is noted that different operating systems may define and support different types of operational states during boot and/or install. Some operating systems (such as various versions of Solaris™) may support various "run levels" corresponding to different operational states, with, for example a run level of "3" corresponding to a state where a more limited set of functionality is available than at a run level of "6". A command such as "init N" may be used to bring up or initialize a host to run level N in such systems. The bringing up of host 101 to a designated operational state may be considered analogous to initializing host 101 to a desired run level from which a designated recovery method may be executed. Other operating systems may define various levels of "subsystems" corresponding to different operational states, as described earlier. As also noted earlier, recovery methods (e.g., methods 423, 425, 427) may be developed corresponding to a variety of different operational states in different embodiments. For example, in one embodiment, a first method may be developed to be executable in an operational state that does not require a user interface, while a second method may require user input (e.g., to select a backup device from which data is to be read) and may not be operable until an operational state that supports a graphical user interface is reached.

In some embodiments and for some operating systems, the steps illustrated in FIG. 4 may not be performed in the specific sequence shown in FIG. 4. In one embodiment, for example, one or more steps may be performed in parallel, such as the kernel setting up an execution environment concurrently other processes. In another embodiment, one or more steps may be omitted. For example, only a first application execution environment may be required to initiate processes corresponding to recovery software 125. In other embodiments, more than one environment may be established for different processes. In some embodiments, as described below, recovery software 125 may be configured to provide one or more user interfaces, for example allowing a user to specify additional configuration information, to select a particular operating system type or version, or otherwise. While in the depicted embodiment, system configuration information includes registry data 427, in other embodiments system configuration information may be organized using other types of data structures.

A number of different types of computer-readable media may be used to package and/or provide part or all of recovery software 125 to a host 101 in different embodiments. Generally speaking, a computer readable medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, recovery software 125 may be included within an operating system, volume manager, or another software package. In other embodiments, one or more components of recovery software 125 may be packaged as independent software modules. In one embodiment, recovery software 125 may be included within a set of one or more custom installation CD-ROMs for an operating system. In another embodiment, at least part of the functionality of recovery software 125 described above may be implemented in firmware or in hardware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method in a computing system comprising:
   initiating reboot of an operating system into a recovery environment;
   performing discovery to identify an installed operating system, wherein said discovery comprises discovering physical disks coupled to said computing system, identifying logical volumes on each of said physical disks, and examining each of the logical volumes for installed operating systems;
   determining configuration information of the installed operating system; and
   utilizing the configuration information to establish an operating environment for the recovery environment;
   scheduling in a first environment a task for execution in said recovery environment, wherein said task is scheduled prior to said reboot, wherein completion of said task requires assignment of a given resource to a same drive letter in both the recovery environment and the first environment.

2. The method as recited in claim 1, wherein in response to determining more than one operating system is installed on said volumes, the method further comprises:
   displaying a list of operating systems discovered on the volumes; and
   providing an opportunity for selection of an operating system displayed in the list.

3. The method as recited in claim 1, wherein said reboot comprises rebooting from an external storage media.

4. The method as recited in claim 3, wherein said configuration information is included in a registry of the installed operating system.

5. A computing system comprising:
   a host including a memory;
   a storage device; and
   a processor, wherein the processor is configured to:
      initiate reboot of an operating system of the host into a recovery environment;
      perform discovery to identify an operating system installed on the host, wherein in performing said discovery, the processor is configured to discover physical disks coupled to said computing system, identify logical volumes on each of said physical disks, and examine each of the logical volumes for installed operating systems;
      determine configuration information of the installed operating system;
      utilize the configuration information to establish an operating environment for the recovery environment; and
      schedule in a first environment a task for execution in said recovery environment, wherein said task is scheduled prior to said reboot, and wherein completion of said task requires assignment of a given resource to a same drive letter in both the recovery environment and the first environment.

6. The computing system as recited in claim 5, wherein in response to determining more than one operating system is installed on said volumes, the processor is further configured to:
   display a list of operating systems discovered on the volumes; and
   provide an opportunity for selection of an operating system displayed in the list.

7. The computing system as recited in claim 5, wherein said configuration information includes drive letter assignments.

8. The computing system as recited in claim 7, wherein said configuration information is included in a registry of the installed operating system.

9. The system as recited in claim 5, wherein the storage device comprises an external media, and wherein said reboot is from the external media.

10. The computing system as recited in claim 5, wherein the processor is further configured to store the determined configuration on a system disk coupled to the processor.

11. A computer readable storage medium comprising program instructions, wherein the instructions are executable to:
   initiate reboot of an operating system of the host into a recovery environment;
   perform discovery to identify an operating system installed on the host, wherein in performing said discovery, the processor is configured to discover physical disks coupled to said computing system, identify logical volumes on each of said physical disks, and examine each of the logical volumes for installed operating systems;
   determine configuration information of the installed operating system;
   utilize the configuration information to establish an operating environment for the recovery environment; and
   schedule in a first environment a task for execution in said recovery environment, wherein said task is scheduled prior to said reboot and wherein completion of said task requires assignment of a given resource to a same drive letter in both the recovery environment and the first environment.

12. The computer readable storage medium as recited in claim 11, wherein in response to determining more than one operating system is installed on said volumes, the instructions are further executable to:
   display a list of operating systems discovered on the volumes; and
   provide an opportunity for selection of an operating system displayed in the list.

* * * * *